United States Patent [19]

Werner

[11] 4,212,147
[45] Jul. 15, 1980

[54] FODDER MOWER-CONDITIONER

[75] Inventor: Anton Werner, Saverne, France

[73] Assignee: Kuhn S.A., Saverne, France

[21] Appl. No.: 847,543

[22] Filed: Nov. 1, 1977

[30] Foreign Application Priority Data

Jul. 22, 1977 [FR] France .................. 7723684

[51] Int. Cl.² .................. A01D 67/06; A01D 75/22
[52] U.S. Cl. .................. 56/228; 56/16.2; 56/13.6; 56/6
[58] Field of Search .................. 56/1, DIG. 1, 13.5, 56/13.6, 13.7, 16.4, 16.2, 295, 14.4

[56] References Cited

U.S. PATENT DOCUMENTS

| 2,665,621 | 1/1954 | Smith | 172/78 |
|---|---|---|---|
| 3,462,926 | 8/1969 | Webster et al. | 56/13.6 |
| 3,683,605 | 8/1972 | Jakobi | 56/228 |
| 3,699,755 | 10/1972 | Hauser | 56/16.4 |
| 4,058,958 | 11/1977 | Sadler et al. | 56/228 |
| 4,077,192 | 3/1978 | Klinner et al. | 56/16.4 |
| 4,126,989 | 11/1978 | Oosterling et al. | 56/295 |

*Primary Examiner*—Russell R. Kinsey
*Attorney, Agent, or Firm*—Young & Thompson

[57] ABSTRACT

The disclosure is of a fodder mower-conditioner mounted laterally of a tractor and comprising two or more rotary-scythe cutters and one or more conditioning rotors all rotating about axes which as viewed from above fall within a horizontal plane of a width equal to and containing the horizontal diameters of the tractor rear wheel tires, the rear wheel tire which is nearer the mower-conditioner being nearer to the nearest cutter trajectory than to the nearest conditioning rotor bearing.

3 Claims, 3 Drawing Figures

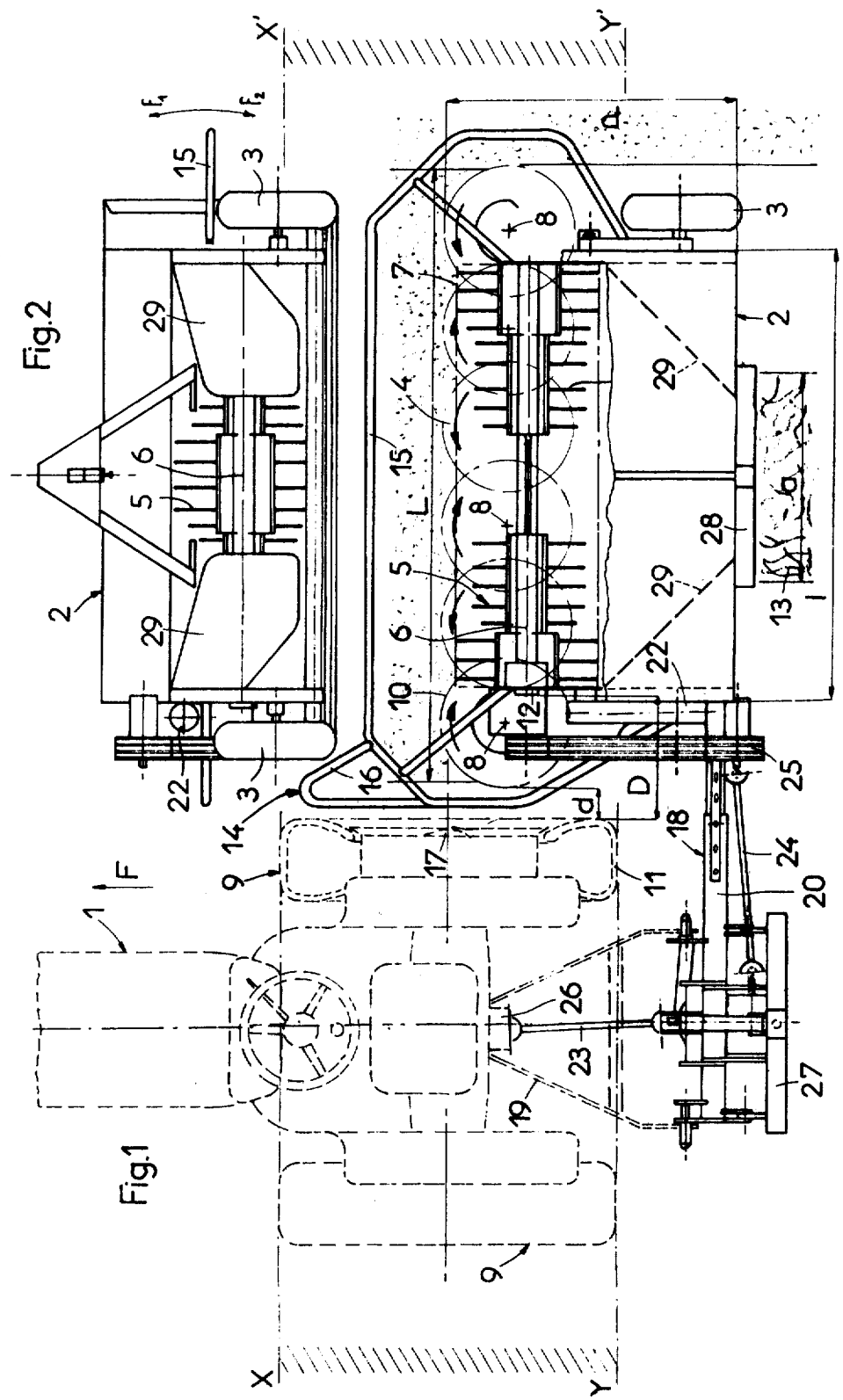

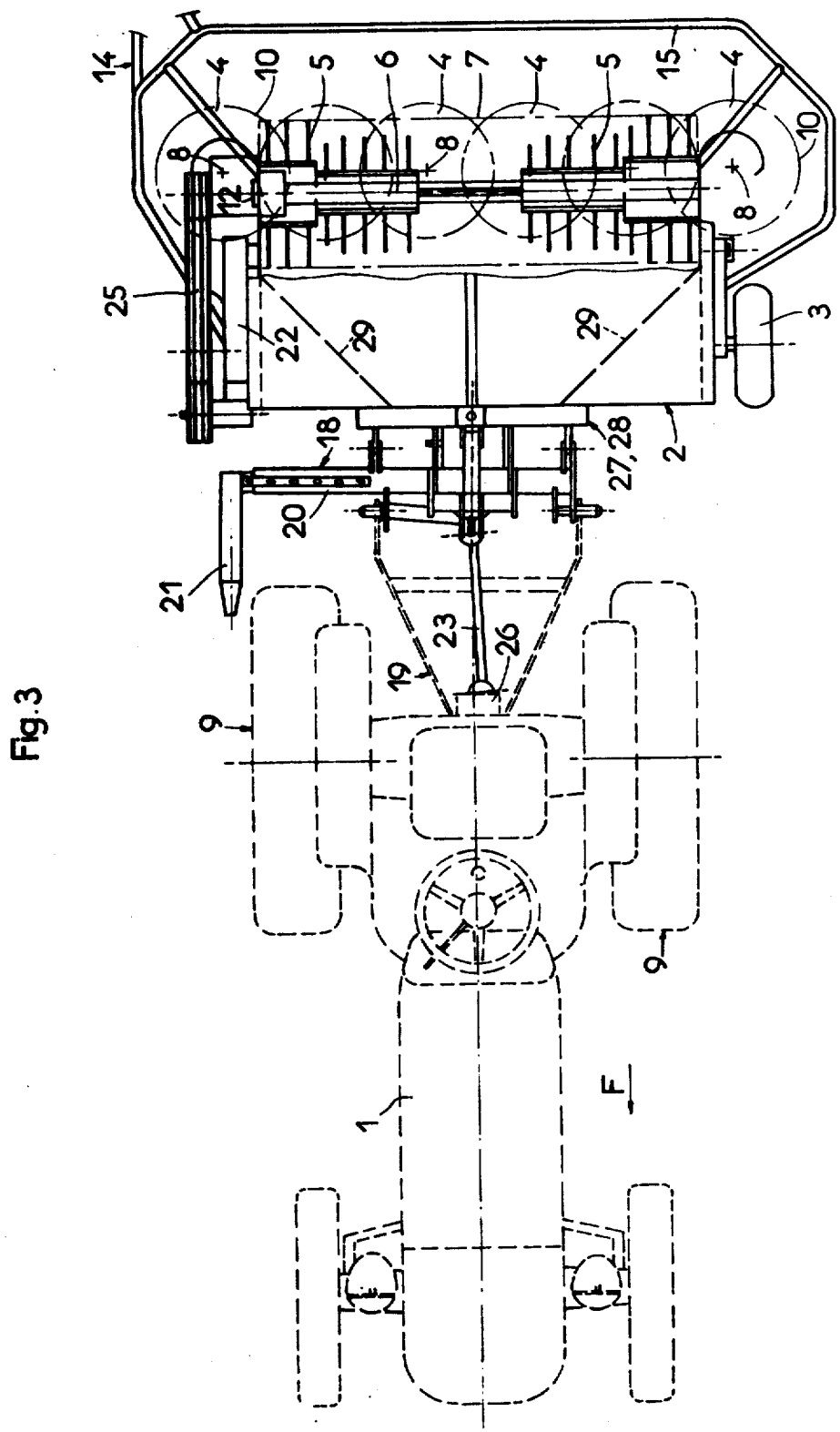

FODDER MOWER-CONDITIONER

INTRODUCTION AND BACKGROUND OF THE INVENTION

The present invention relates to a machine for the mowing and conditioning of fodder in one single action.

This invention in particular concerns a mower having cutter means adapted to be rotatably driven about at least two substantially vertical axes and the cutting width of which is at least equal to two meters or preferably greater than two meters; on this mower there is mounted at least one fodder-conditioning rotor adapted to be rotatably driven about a substantially horizontal axis.

High-output mower-conditioners existing on the market are generally of the type which is "trailed" both in transport and in normal operation. In the normal operation they are generally offset laterally behind the tractor. All the high-output mower conditioners in existence possess several, if not all, of the following drawbacks:

Centre of gravity remote from that of the tractor, difficulty of control both in working and in transport, large occupied ground area, unfunctional adaptation to the tractor in at least one of the machine positions.

It is the purpose of this invention to remedy these drawbacks.

BRIEF SUMMARY OF THE INVENTION

According to one characteristic of the invention the axes of the cutter means and the axis of the conditioning rotor of a motor conditioner seen from above, are entirely situated in normal operation, in an area defined by the straight lines X-X' and Y-Y' delimiting the diameter of the rear wheels of a tractor (FIG. 1) necessary for the operation of the machine.

FURTHER DESCRIPTION AND ADVANTAGES OF THE INVENTION

The mower-conditioner whose working position in relation to the tractor is thus defined is extremely easily controlled by reason of the fact that it extends in the direction of the point of intersection of the axes of the rear wheels and the front wheels of the tractor when the latter are turned in a steering lock. The instantaneous centres of rotation of the wheels of the tractor and of the machine in fact coincide. The result is for example in the case of a turn through 90° that the border between the cut fodder and the still standing fodder is defined by two straight lines at 90° connected by a curvature of centre angle equal to the angle of the turn. This change of direction of the mower conditioner is of course effected without further manoeuvre than the turning of the steering wheel of the tractor, that is to say reversing or other manoeuvres are superfluous.

According to another characteristic of the invention the distance d of the rotary path of the cutter members closest to one of the rear wheels of the tractor from the tyre of the said wheel is less than the distance D of the bearing of the conditioning rotor situated nearest to the said wheel from the said tyre. The conditioning width l is thus less than the cutting width L of the mower conditioner, which immediately after cutting reduces the width of flow of the fodder through the machine, so that the final width a of the windrow, further reduced by virtue of windrowing plates, is approximately equal to the width of the windrows which conventional mower-conditioners form, which however have a smaller cutting width. Despite the large cutting width L the window of width a which the machine according to the invention forms can thus be collected by a forage harvester of conventional type existing on the market, without the necessity of effecting a supplementary windrowing operation.

According to another characteristic of the invention, during operation the front portion of the machine is disposed in front of the axis of the conditioning rotor, while during transport the same front portion is situated behind the said rotor axis, the machine being seen in normal operation and in transport position in the direction of travel of the tractor.

The reversal of the machine through 180° between its normal operating position and its transport position in which it is entirely carried extending perpendicularly in the direction of travel of the tractor, possesses the advantage that in this latter carried transport position the centre of gravity of the machine is closest to that of the tractor. In fact if the machine were carried for transport in the same position which it occupies in the normal operation, its hitch device would be relatively remote from its centre of gravity by reason of the presence of its cutting mechanism and its guard. Moreover the said hitch device would be in danger of hindering the cutting and flow of the fodder, which is not the case when the said hitch device is mounted on the rear of the machine, seen in its direction of travel, in the normal operating position.

According to a supplementary characteristic of the invention the width L of the cutting front of the machine is greater than the depth P of the said machine.

The result of this characteristic is that the mower-conditioner according to the invention is very compact. As it is hitched in the normal operating position laterally beside the tractor necessary for its operation, the said machine has the advantage of not extending to the rear, beyond the hitch device of the tractor. Thus it is possible to hitch various other machines such as for example a tedder behind the tractor without difficulty.

According to a further characteristic of the invention the hitch device of the machine for the transport position, seen in its direction of travel, comprise a first element situated further forward than a second element of said hitch device, said second element being connected to the tractor. In fact the latter element is situated behind another hitch device of the machine in the normal operating position, which is itself hitched behind the lift linkage of the tractor. The hitch device for the normal operating position of the machine and the second element of the hitch device for the transport position of the machine are fixed to the tractor and disposed one behind the other and are usable indifferently without particular adaptation and without being dismantled, for the purpose of being respectively combined with their corresponding hitch device provided on the machine.

According to a final characteristic of the invention the above-described mower-conditioner comprises a bumper or the like extending beyond the outline of the machine. This bumper is intended to abut on one of the rear wheels of the tractor in order to maintain a certain distance between the rear wheel of the tractor and the rotary path of the cutters of the machine. This bumper is in the form of a bow of adjustable position.

The advantage of this stop consists in that it prevents the cutters of the mower conditioner, hitched laterally beside the rear wheel of the tractor and quite close thereto, from cutting the tyre of the said wheel, especially in manoeuvres such for example as reversing.

The invention will be explained in greater detail hereinafter in the description of a non-limitative example of embodiment given with reference to the accompanying drawings, in which

BRIEF DESCRIPTION OF THE VIEWS IN THE DRAWINGS

FIG. 1 shows a plan view of a mower-conditioner according to the invention in the working position, FIG. 2 represents a rear view of the mower-conditioner according to FIG. 1, the tractor not being associated with this machine, FIG. 3 shows a plan view of a mower-conditioner according to the invention in the transport position.

DETAILED DESCRIPTION OF THE PREFERRED EMBODIMENTS

In the drawings, as represented in FIG. 1, the agricultural machine hitched to the tractor 1 in the normal operating position is of the mower-conditioner type. This machine comprises a chassis 2 supported by wheels 3 provided on either side of the said chassis 2. When it is moved by the tractor 1 in its forward direction F, the cutter means 4 of the said mower-conditioner cut the fodder which is then conditioned with the aid of a beater rotor 5 the axis 6 of which is situated above and behind the front portion 7 of the cutter means 4 rotating about substantially vertical axes 8.

The mower-conditioner according to the invention is connected to the tractor 1 such that it extends laterally therebeside and not behind it, so that the axes 8 of the cutter members 4 of the machine and the axis 6 of the beater conditioning rotor are entirely situated within an area defined by the straight lines X-X' and Y-Y' delimiting the diameter of the rear wheels 9 of the tractor 1.

In FIGS. 1 and 3 it is seen that the mower-conditioner comprises six cutter members 4 and that the cutter members situated at the extremities of the machine extend beyond the outline defined by the chassis 2 of the machine. Thus the distance d of the rotary path 10 of the cutter member 4 closest to the right rear wheel 9 of the tractor 1 from the tyre 11 of this wheel 9 is less than the distance D separating this same tyre 11 from the bearing 12 of the shaft 6 of the conditioning beater rotor 5. Therefore the width L of the front portion 7 of the machine is greater than the conditioning width l, which contributes to reduce the width a for the windrow 13 which the machine will form, immediately after the cutting of the fodder. This characteristic permits the reduction of the occupied ground space of the machine, which thus is particularly easily conrolled and light. In fact it can be turned about practically on the spot, which is very practical in manoeuvres at the ends of the field while avoiding passage over already cut fodder and crushing of still standing fodder.

As has been seen above, the distance d separating the rotary path 10 of the cutter member 4 closest to the rear wheel 9 of the tractor 1 is very short. Thus the said cutting member must be prevented from cutting the tyre 11 of the wheel 9. To this end a bumper 14 is provided fixed to a guard 15 extending around the machine. This bumper 14, which extends beyond the outline of the mower-conditioner, is intended to abut on the wheel 9 of the tractor in order to maintain a certain distance between the said wheel 9 and the rotary path 10 of the adjacent cutter. In FIG. 1 this bumper 14 is in the form of a bow 16 extending forward and at least partly parallel with one of the sides of the machine facing the tractor 1, at the level of the wheel 9 of the latter.

The presence of this bumper 14 is necessary by reason of the fact that the hitch device 18 of the machine in the normal operating position has a certain play which can for example be taken up when the tractor 1 moves in reverse. In this case the machine tends to remain stationary, which causes the cutter member 4 closest to the wheel 9 to approach the tyre 11 and to be in danger of cutting it.

The hitch device 18 permitting the connection of the mower-conditioner to the tractor 1 in the normal operating position is linked to the lift linkage 19 of the tractor 1 and has substantially the form of an L the longer arm 20 of which is disposed substantially horizontally and perpendicularly to the forward direction F of the tractor 1, while the shorter arm 21 (FIG. 3) extends horizontally and parallel with the intended forward direction F of the said tractor 1. This latter arm 21 engages in the normal operating position of the machine in a cylindrical socket 22 mounted on the mower-conditioner thus permitting the machine to follow irregularities of the ground, in the direction of the arrows f1 and f2, independently of the tractor 1.

Transmission elements such as telescopic shafts 23 and 24 and belts 25 transmit their rotating movement to the conditioning beater rotor 5 and to the cutter means 4 from the power takeoff 26 of the tractor 1.

In the example of embodiment as illustrated in the accompanying Figures, the cutter means 4 closest to the right rear wheel 9 of the tractor 1 are directly driven. Transmission members lodged in a casing situated beneath the said cutter members 4 co-operate with one another for the purpose of driving the other cutter members 4.

Behind the hitch device 18 linked to the lift linkage 19 of the tractor 1 there is provided an element 27 of another hitch device serving for transporting the machine. Another element 28 of said hitch device is fast with the chassis 2 of the machine that is behind the cutter means and the conditioning rotor. These complementary elements 27 and 28 serving for the transport of the machine are here of the rapid-hitch type and possess approximately the form of two male and female triangles intended to fit one within the other (FIG. 2). When the coupling of these triangles is effected it remains only to place the lift linkage 19 of the tractor 1 in its high position for the machine to be entirely carried for transport. In FIG. 1 it is seen that the element 28 of the machine disposed in the normal operating position is situated slightly in front of the element 27 connected to the tractor 1. This is obtained by virtue of the compactness of the machine which, although possessing a great cutting width L, can form a windrow 13 of width a substantially smaller than the cutting width, by reason of the fact that as soon as the fodder is cut it is collected little by little upon itself. In fact the conditioning width l is less than the cutting width L while the windrowing width a is less than the conditioning width l by virtue of the presence of the windrowing plate 29 (FIG. 2).

Despite the great cutting width L the windrow 13 of width a formed by the machine according to the invention can thus be gathered by a forage harvester of conventional type existing upon the market, without the need for carrying out a supplementary windrowing operation.

Thus the concept is reached of machines whose depth P is substantially less than their working width L, which is of great interest for the transport of these machines as will be seen hereinafter.

This also has the advantage of completely freeing the rear of the tractor 1. Thus it is possible to foresee a supplementary haymaking machine hitched behind the tractor 1.

In its carried transport position as represented in FIG. 3, the two hitch devices 27 and 28 are coupled and the machine is then entirely carried for transport in a position in which its centre of gravity is as close as possible to that of the tractor 1.

This is due on the one part to the fact that the machine extends transversely in relation to the forward direction F of the tractor, in a position in which the axis of the tractor perpendicularly intersects the front portion 7 of the machine, substantially in the centre thereof, and on the other part by virtue of the fact that the axis 6 of the rotor 5 is disposed in front of the front portion 7.

Thus the risks of jamming of the tractor 1, even if of relatively low power, are reduced and this tractor can carry a mower-conditioner having a normal operating width greater than or equal to two meters, which has never been possible hitherto.

It will be noted that as the element 27 of the hitch device intended for the transport of the machine is permanently installed behind the element 18 of said hitch device, the one or the other of these devices 27 or 18 can advantageously be used indifferently without special adaptation, that is to say without the need to effect any dismantlement in order to be able to couple one or the other of the said devices 27 or 18 with its complementary member 28 or 22 fast with the machine.

It is quite apparent that it will be possible to effect various modifications, improvements or additions to the example of embodiment as described above without thereby departing from the scope of the present invention. In particular it is possible to modify the fodder conditioning device provided that it is always used with a cutting device.

What is claimed is:

1. A mower conditioner adapted to be connected to a tractor provided with a lift linkage, said mower conditioner comprising
   cutter means adapted to be rotatably driven about at least two approximately vertical axes
   at least one conditioning rotor adapted to be rotatably driven about an approximately horizontal axis
   a first element of a first hitch device that entirely carries the mower conditioner in its transport position, said first element being disposed behind the cutter means and the conditioning rotor of the mower conditioner in its normal operating position
   a second hitch device that advances the mower conditioner in said normal operating position, said second hitch device having means to connect it with the lift linkage of the tractor
   a second element of the first hitch device releasably connectable with said first element, said second element being disposed behind the second hitch device of the mower conditioner in said normal operating position, wherein when the two elements of the first hitch device are connected the mower conditioner is entirely carried.

2. A mower conditioner as claimed in claim 1 wherein the first element of the first hitch device and the second hitch device are indifferently utilizable without adaptation for the purpose of being respectively connected with the second element of the first hitch device for carrying the mower conditioner in its transport position, or with said mower conditioner when it is in its normal operating position.

3. A mower conditioner as claimed in claim 1 wherein the first element of the first hitch device is disposed in front of said cutter means and conditioning rotor in said transport position.

* * * * *